Figure 1:
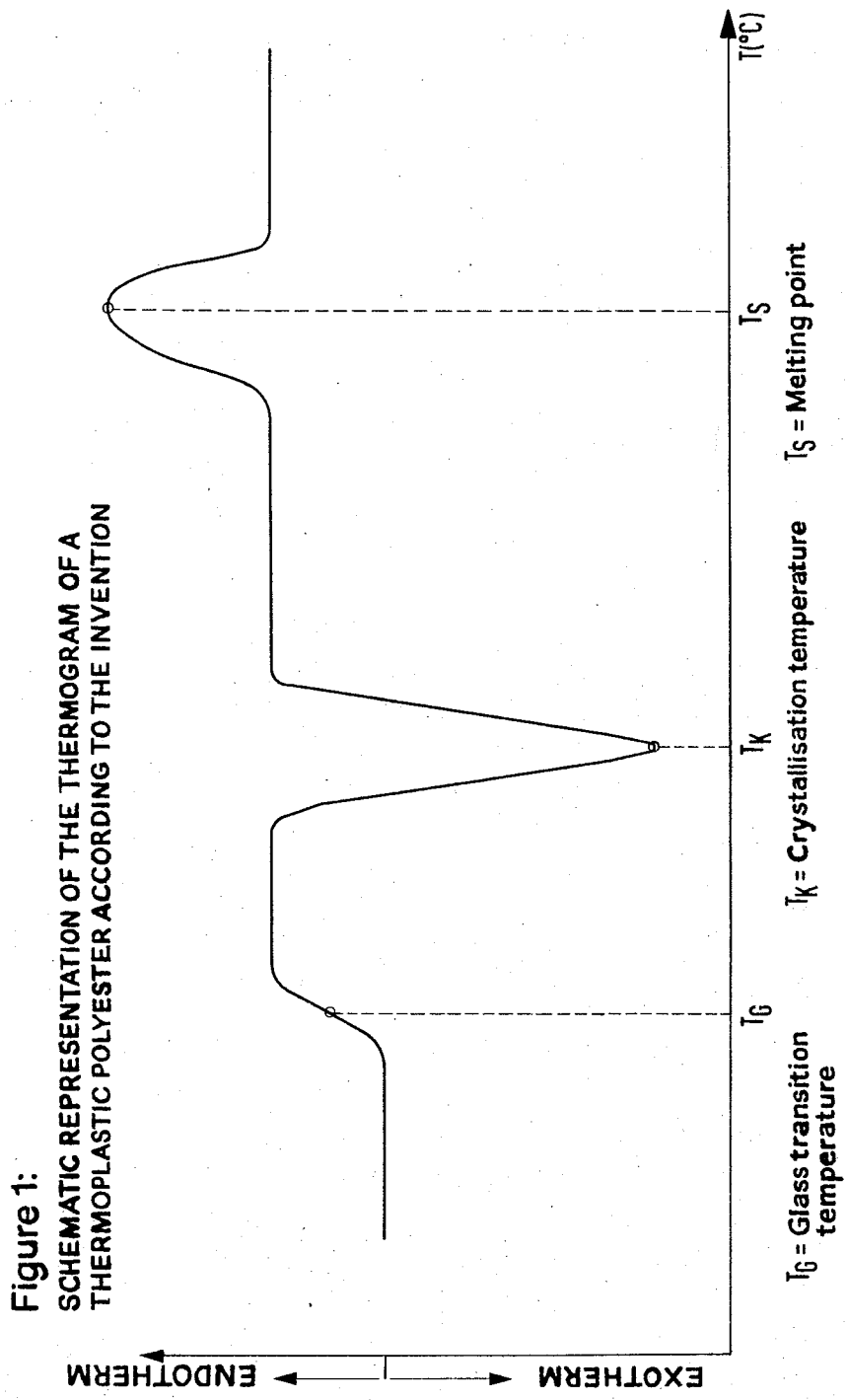

United States Patent [19]
Habermeier et al.

[11] 3,860,564
[45] Jan. 14, 1975

[54] LINEAR HOMOPOLYESTERS AND COPOLYESTERS BASED ON BIS(HYDROXYALKYL)BENZIMIDAZO-LONES

[75] Inventors: Jurgen Habermeier, Pfeffingen, Switzerland; Lothar Buxbaum, Lindenfels, Germany; Daniel Porret, Binningen; Hans Batzer, Arlesheim, both of Switzerland

[73] Assignee: Ciba-Geigy Corporation, Ardsley, N.Y.

[22] Filed: Aug. 9, 1973

[21] Appl. No.: 387,059

[30] Foreign Application Priority Data
Aug. 25, 1972 Switzerland.................. 12655/72

[52] U.S. Cl............................................. 260/75 N
[51] Int. Cl......................... C08g 17/08, C08g 20/32
[58] Field of Search.................................. 260/75 N

[56] References Cited
UNITED STATES PATENTS
2,732,316  1/1956  July et al. ................. 117/62.2
2,785,176  3/1957  Vebra ......................... 260/309.7

OTHER PUBLICATIONS

Harrison et al., J. Chem. Soc., 1961, 4827–4830.

Sawlewicz et al., Acta Polon. Pharm., 19, 299–303 (1962).

*Primary Examiner*—Melvin Goldstein

[57] ABSTRACT

New homopolyesters and copolyesters are obtained by esterifying 1,3-bis-(hydroxyalkyl)-benzimidazolones and optionally alkanediols with terephthalic acid and/or isophthalic acid or their polyester-forming derivatives in a known manner and subsequently polycondensing the product. The new homopolyesters and copolyesters are distinguished by better mechanical properties than conventional polyalkylene phthalates and are in particular suitable for use as "engineering plastic" materials.

3 Claims, 1 Drawing Figure

SCHEMATIC REPRESENTATION OF THE THERMOGRAM OF A THERMOPLASTIC POLYESTER ACCORDING TO THE INVENTION $T_G$ = Glass transition temperature
$T_K$ = Crystallisation temperature
$T_S$ = Melting point SCHEMATIC REPRESENTATION OF THE THERMOGRAM OF A THERMOPLASTIC POLYESTER ACCORDING TO THE INVENTION $T_G$ = Glass transition temperature    $T_K$ = Crystallisation temperature    $T_S$ = Melting point

LINEAR HOMOPOLYESTERS AND COPOLYESTERS BASED ON BIS(HYDROXYALKYL)BENZIMIDAZOLONES

The present invention relates to new, linear homopolyesters and copolyesters based on terephthalic acid and/or isophthalic acid, which contain, as the diol component, partially or completely defined 1,3-bis-hydroxyalkyl-substituted benzimidazolones, the process for the manufacture of the new polyesters and the use of these polyesters, which are valuable thermoplastic materials.

Thermoplastic polyesters of terephthalic acid and aliphatic diols such as, for example, poly(ethylene terephthalates) and poly(butylene terephthalates), and their use as "engineering thermoplastic" materials in industry, are known. However, these polyesters, from which mouldings with good mechanical properties can be manufactured, also have disadvantages . Thus, in general, the glass transition temperature of these polyesters is very low, especially in the case of the poly(butylene terephthalates), which is found to be a disadvantage in numerous industrial applications, since the mouldings lose their stiffness at relatively low temperatures. A further disadvantage of the known poly(ethylene terephthalates) and poly(butylene phthalates) is that their processing requires fairly high temperatures. It is furthermore known, from German Offenlegungsschrift (DOS) 2,008,984 that the properties of the poly-(ethylene phthalates) and poly(propylene phthalates) can be improved by cocondensing di-spiro(5,1,5,1)-tetradecane-7,14-diol into the polyester, with 15–50% of the ethylene glycol or propylene glycol being replaced by this special, expensive tricyclic diol.

It has now been found that poly(alkylene terephthalates) and poly(alkylene isophthalates) having better properties can also be obtained by co-condensation of 1,3-bis-(hydroxyalkyl)-benzimidazolones, which are inexpensive to manufacture. It is surprising that the improvement in properties of these polyesters is also achieved with benzimidazolone derivatives containing hydroxymethyl groups and hydroxyethyl groups since it is known that because of their freedom of rotation, hydroxymethyl and hydroxyethyl groups do not impart stiffness to the molecule. On the other hand, the improvements in properties are also achieved with other poly(alkylene terephthalates), such as, for example, poly (butylene terephthalate). Furthermore the homopolyesters, that is to say polyesters which are built up only of terephthalic acid and/or isophthalic acid and the heterocyclic diol, also show excellent properties.

The homopolyesters and copolyesters according to the invention are distinguished, compared to the poly-(alkylene terephthalates) by higher glass transition temperatures and lower melting points or softening points, that is say they display better thermomechanical properties coupled with better processing possibilities.

Hence, the subject of the present invention are new, linear, thermoplastic homopolyesters or copolyesters of relative viscosity 0.5 to 3.0 dl/g (decilitres/gram) measured at 30°C on a 1% strength solution consisting of 50 parts of phenol and 50 parts of tetrachloroethane, which are characterised by the structural element of the formula I

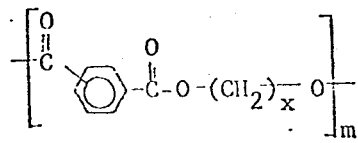

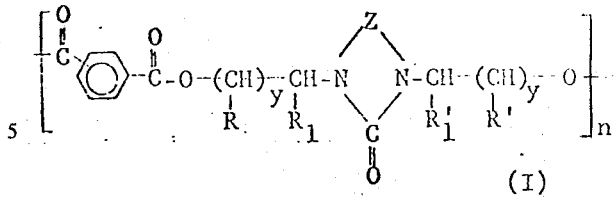

wherein the two carbonyl groups located on the aromatic ring are in the para- or meta-position to one another, Z denotes a divalent radical of the formulae

R and R' independently of one another each represent a hydrogen atom or the methyl or phenyl group, $R_1$ and $R_1'$ each denote a hydrogen atom or R and $R_1$, and/or $R_1'$ and R', together denote the tetramethylene radical, y denotes the number 0 or 1, x represents a number from 2 to 10, m represents 0 or integers and n represents integers, and the proportion of n to m corresponds to the quotient $n/(n + m) = 0.005$ to 1.0.

Preferably, the polyesters having the structural element of the formula I have a relative viscosity of 1.0 to 2.5 dl/g, x in the indicated formula I denotes a number from 2 to 4 and the ratio of n to m corresponds to the quotient $n/(n + m) = 0.05$ to 1.0.

The new polyesters possessing the structural element of the formula I are obtained according to known processes by polycondensing n mols, or if relevant $n + m$ mols, of terephthalic acid, isophthalic or their polyester-forming derivatives with n mols of a diol of the formula II

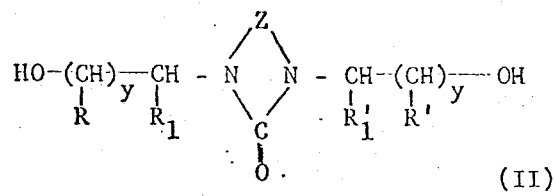

if appropriate mixed with m mols of an aliphatic diol of the formula III $$HO (CH_2)_x OH$$

in amounts corresponding to the quotient $n/(n + m) = 0.005$ to 1.0 and in the presence of catalysts, in a known manner, until a relative viscosity of 0.5 to 3.0 dl/g is reached.

Preferably, the terephthalic acid, isophthalic acid or their polyester-forming derivatives are polycondensed in amounts corresponding to the quotient $n/(n + m) = 0.05$ to 1.0, until a relative viscosity of 1.0 to 2.5 dl/g is reached.

Polyester-forming derivatives of terephthalic acid and isophthalic acid which are used in the process are in the main the low molecular dialkyl esters which contain 1 to 4 carbon atoms in the alkyl group, but preferably the dimethyl esters, and the diphenyl esters. Further suitable polyester-forming derivatives are also the acid dihalides, especially the acid dichlorides, and the anhydrides of terephthalic acid and isophthalic acid.

The diols of the formula II can easily be manufactured by addition of 2 mols of formaldehyde or 2 mols of alkylene oxide, such as ethylene oxide, propylene oxide, cyclohexene oxide or styrene oxide, to 1 mol of benzimidazolone or its benzhydrogenated derivatives, in the presence of catalysts.

Examples of diols of the formula II are: 1,3-bis-(2'-hydroxyethyl)-benzimidazolone, 1,3-bis-(2'-hydroxy-n-propyl)-benzimidazolone, 1,3-bis-(2'-hydroxy-2'-phenylethyl)-benzimidazolone, 1,3-bis-(2'-hydroxyethyl)-tetrahydrobenzimidazolone, 1,3-bis-(2'-hydroxy-n-propyl)-tetrahydrobenzimidazolone, 1,3-bis-(2'-hydroxy-2'-phenylethyl)-tetrahydrobenzimidazolone, 1,3-bis-(2'-hydroxyethyl)-hexahydrobenzimidazolidone, 1,3-bis-(hydroxymethyl)-tetrahydrobenzimidazolone and 1,3-bis-(hydroxymethyl)-benzimidazolone.

The formula III represents the aliphatic diols of the homologous series from ethylene glycol up to 1,10-decanediol.

The new polyesters can be manufactured according to various known processes, for example by solution condensation or azeotropic condensation, by interfacial condensation, melt condensation or solid phase condensation, or by a combination of these methods, depending on what starting compounds and reaction catalysts are used.

Preferably, the new polyesters are manufactured by esterifying or trans-esterifying terephthalic acid, isophthalic acid or their low molecular dialkyl esters with the diols of the formula II, preferbly mixed with the diols of the formula III, in an inert atmosphere, for example a nitrogen atmosphere, in the presence of catalysts and with simultaneous removal of the water or alkanol produced, at 150°–220°C, and subsequently carrying out the polycondensation at 200°–270°C under reduced pressure in the presence of certain catalysts, until the polycondensates have the desired viscosity.

Advantageously, in manufacturing copolyesters according to this process, the aliphatic diol component of the formula III is employed in excess, so that after the esterification or trans-esterification reaction essentially monomeric diglycol esters of both diols of the formulae II and III are obtained, which are then polycondensed in the presence of a polycondensation catalyst in vacuo whilst distilling off the excess aliphatic diol of the formula III.

As esterification catalysts it is possible to use, in a known manner, inorganic or organic acids, for example hydrochloric acid or p-toluenesulphonic acid, but also metal compounds which are suitable for use as trans-esterification catalysts.

Since some catalysts preferentially accelerate the trans-esterification and other preferentially accelerate the polycondensation, a combination of several catalysts is advantageously used. Examples of suitable trans-esterification catalysts are the oxides, salts or organic compounds of the metals calcium, magnesium, zinc, cadmium, manganese and cobalt. The metals and alloys of these, as such, can also be used as catalysts. On the other hand, the polycondensation is preferably catalysed by lead, titanium, germanium and especially antimony or their compounds. These catalysts can be added to the reaction mixture conjointly or separately, that is to say before and after the esterification or trans-esterification. These catalysts are employed in amounts of about 0.001 to 1.0 percent by weight relative to the acid component.

The new homopolyesters and copolyesters can also be manufactured by condensing the starting compounds in the melt up to a certain viscosity, then granulating the polycondensate, for example with the aid of an under-water granulator, drying the granules and then subjecting them to a solid phase condensation, using vacuum and temperature below the melting point of the granules. This also results in higher viscosities of the polyesters.

Another process for the manufacture of the new polyesters consists of polycondensing the terephthalic acid dihalides or isophthalic acid dihalides, preferably the acid dichlorides, with the diols of the formula II, optionally mixed with the diols of the formula III and in a solvent, in the presence of a basic catalyst, in the temperature range of 0° to 100°C, with elimination of hydrogen halide. The tertiary amines or the quaternary ammonium salts are preferably used as basic catalysts. The proportion of the basic catalyst can be from 0.1 to 20 mol % relative to the acid halides. Such condensations can also be carried out in the melt, without the use of a solvent.

The polycondensation reaction is carried out until the polyesters have a relative viscosity of 0.5 to 3.0 dl/g (decilitre/gram), preferably 1.0 to 2.5 dl/g. Depending on the nature of the catalyst used and the size of the batch, the reaction times are about 30 minutes to several hours. The resulting polyester melt is removed from the reaction vessel and then granulated or converted into chips in the usual manner.

In working up the polyester melt, or even before the polycondensation reaction, inert additives of all kinds can be added to the reaction mixture, such as, for example, fillers, reinforcing substances, especially glass fibres, inorganic or organic pigments, optical brighteners, delustering agents and flameproofing or flame-retarding additives.

The polycondensation reaction can also be carried out discontinuously, in which case all the remaining known measures, such as the addition of inert fillers, flame-proofing additives, pigments and the like can already be taken during the last condensation steps, for example during the solid phase condensation or at the end of the melt condensation.

Depending on the starting substances used, the homopolyesters and copolyesters according to the invention have predominantly crystalline or predominantly amorphous regions. If the new polyesters do not contain any coloured additives, they are colourless to pale yellow in colour and are thermoplastic materials from which moulded materials with valuable thermomechanical properties can be manufactured according to the customary moulding processes, such as casting, injection moulding and extrusion.

In particular, the new homopolyesters and copolyesters are suitable for use as engineering thermoplastic materials, which are suitable for the manufacture of mouldings, such as gearwheels, containers for chemicals or foodstuffs, machine components and apparatus components, sheets, slabs, films and hot-melt adhesives, and also for the manufacture of semi-finished goods which can be shaped by machining.

The polyesters manufactured in the examples which follow are characterised in more detail by the following data.

The polyesters are characterised by the morphological changes which are measured by means of differential thermoanalysis on a sample which has been heat-treated at 30°C above the melting point or softening point for 3 minutes and has then been chilled rapidly. The chilled sample is heated by means of the "DSC-1B" Differential Scanning Calorimeter of Messrs. Perkin-Elmer at a speed of heating of 16°C/minute. The thermogram of the sample (compare the schematic representation in FIG. 1) shows the glass transition temperature ($T_g$), the crystallisation temperature ($T_c$) and the melting point ($T_m$). The point of inflexion in the sudden increase of the specific heat in the thermogram is quoted as the glass transition temperature, the apex of the exothermic peak is quoted at the crystallisation temperature and the apex of the endothermic peak is quoted as the melting point. The relative viscosity of the polycondensates of the examples is determined on solutions of 1 g of polyester in 100 ml of a mixture consisting of equal parts of phenol and tetrachloroethane, at 30°C. The softening point is determined on a heated stage microscope using a speed of heating of 15°C/minute, a cross being formed from two filaments and the softening point being regarded as the temperature at which the sharp angles of the cross disappear.

EXAMPLE 1

A mixture of 56.6 g (0.25 mol) of 1,3-bis-(2'-hydroxyethyl)-tetrahydrobenzimidazolone (melting point = 154°– 156°C) and 48.6 g (0.25 mol) of dimethyl terephthalate is condensed under the action of a catalytic mixture of 0.42 g of antimony powder, 0.11 g of lead powder, 0.05 g of zinc dust and 0.42 g of triphenylphosphite in a laboratory glass apparatus in accordance with the following programme: 14 hours at 150°C under a nitrogen atmosphere, 8 hours at 240°C/30 mm Hg and 12 hours at 255°C/0.1 mm Hg.

The product thus obtained is purified by reprecipitation from a solvent mixture consisting of chloroform and ether. 73.8 g of an almost colourless polyester (82.8% of theory) of softening point 142°C (according to the Kofler method) are obtained. The thermogravimetric analysis shows that the polycondensate obtained is rather heat-stable. The maxima of the decomposition of the polycondensate in air are at 390°C (46.3% of the substance) and at 570°C (50.9% of the substance).

The "DSC" (Differential Scanning Calorimeter) analysis shows the glass transition temperature to be at 107°C and the exothermic crystallisation at 121°C. The polyester obtained, which has the following structural unit

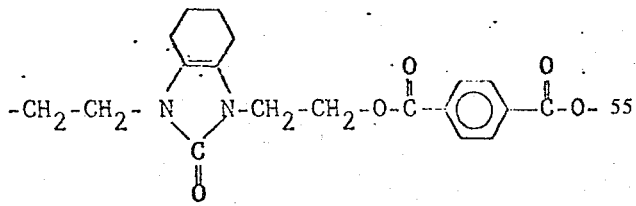

contains 7.90% of nitrogen (calculated, 7.86%), relative to the structural element.

EXAMPLE 2

45.25 g (0.2 mol) of the diol used in Example 1 are condensed directly with 33.2 g (0.2 mol) of terephthalic acid, using the same amount of the catalyst mixture used in Example 1.

The condensation is carried out according to the following time-temperature programme: 3 hours at 190° – 205°C under a nitrogen atmosphere and 5 hours at 262° – 275°C/0.1 mm Hg.

The hard and tough polyester thus obtained, which can be purified according to Example 1, softens at 150°C (Kofler) and consists of the structural unit indicated in Example 1.

EXAMPLE 3

Condensation of 42.9 g (0.221 mol) of dimethyl terephthalate with 11.6 g (0.188 mol) of ethylene glycol and 15.0 g (0.066 mol) of 1,3-bis-(2'-hydroxyethyl)-tetrahydrobenzimidazolone under the catalytic action of 0.04 g of zinc dust, 0.37 g of triphenylphosphite, 0.37 g of antimony and 0.09 g of lead for 3 hours at 150° – 190°C in a nitrogen atmosphere and then for 5 hours at 270°C and 0.3 mm Hg yields a copolyester which softens at 112°C and of which the elementary analysis and proton-magnetic resonance spectrum (60 Hz H-NMR) are in agreement with the structural unit shown below:

| Elementary analysis: | found | calculated for $m : n = 2 : 1$ |
|---|---|---|
| | 63.22% C | 63.24% C |
| | 27.43% O | 28.08% O |
| | 3.64% N | 3.78% N |

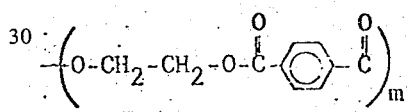

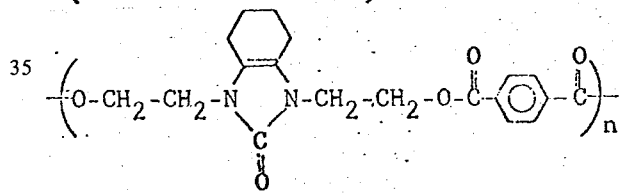

EXAMPLE 4

A mixture of 55.6 g (0.25 mol) of 1,3-bis-(2'-hydroxyethyl)-benzimidazolone and 48.6 g (0.25 mol) of dimethyl terephthalate is condensed with the amounts of catalyst indicated in Example 3 in accordance with the following temperature programme: 3 hours at 180°C under a nitrogen atmosphere and 7 hours at 220° – 230°C/0.5 mm Hg under a nitrogen atmosphere.

The colourless polyester thus obtained softens at 129°C (Kofler). The H-NMR spectrum and elementary analysis confirm that the polyester obtained is essentially built up of the following structural element:

| Elementary analysis: | found | calculated |
|---|---|---|
| | 8.00% N | 7.95% N |
| | 4.60% H | 4.57% H |

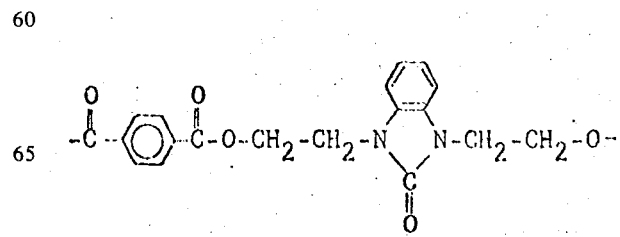

EXAMPLE 5

A mixture of 97.1 g (0.5 mol) of dimethyl terephthalate, 36 g (0.4 mol) of 1,4-butanediol and 33.3 g (0.15 mol) of 1,3-bis-(2'-hydroxyethyl)-benzimidazolone is condensed under the catalytic action of 0.1 g of zinc dust, 0.6 g of antimony, 0.5 g of triphenylphosphite and 0.1 g of lead for 150 minutes at 180° – 195°C in a nitrogen atmosphere and is subsequently condensed further for 10 hours at 233°C under 0.6 mm Hg. A colourless polyester is obtained, in which, according to the H—NMR spectrum, the structural unit shown below is present in the ratio of $m : n = 0.6 : 1$.

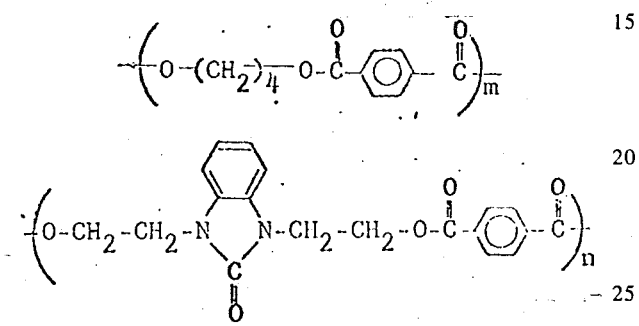

EXAMPLE 6

A mixture of 48.6 g (0.25 mol) of dimethyl terephthalate and 48.6 g (0.25 mol) of 1,3-bis-(hydroxymethyl)-benzimidazolone is polycondensed under the catalytic action of 0.05 g of zinc dust, 0.3 g of antimony, 0.3 g of triphenylphosphite and 0.07 g of lead in accordance with the following temperature-time programme: 7 hours at 150° – 155°C in a nitrogen atmosphere and 5 hours at 230°C/0.3 mm Hg.

A colourless polyester is obtained, which softens at 133°C and which is essentially built up of the following structural unit:

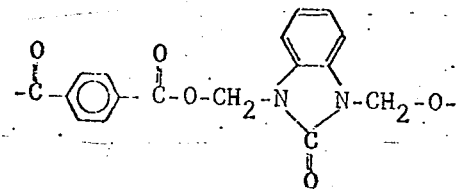

EXAMPLE 7

300 g of dimethyl terephthalate (DMT), 210 g of ethylene glycol, 32.5 g of 1,3-bis-(2'-hydroxyethyl)-benzimidazolone (10 mol % relative to DMT), 0.095 g of zinc acetate and 0.108 g of antimony trioxide are introduced into a 2 litre reactor equipped with stirrer, nitrogen inlet, condenser and temperature mesuring device and the mixture is heated to 190°C. 98% of the amount of methanol theoretically to be expected are distilled off over the course of 1.5 hours whilst stirring and passing nitrogen through the mixture, during which time the temperature of the reaction mixture rises to 205°C.

The reaction mixture is then heated to 240°C and a vacuum of 50 mm Hg is applied by means of a water pump over the course of half an hour whilst at the same time the reaction temperature is raised to 260°C. Using a vacuum pump, the vacuum is improved to 0.6 mm Hg over the course of half an hour, with the reaction temperature remaining the same, and is maintained for a further 3.0 hours.

Before opening it, the reactor is flushed with nitrogen and a partially crystalline polyester with the following characteristic data is obtained:

| | |
|---|---|
| Relative viscosity: | 1.86 |
| Glass transition temperature (Tg): | 84°C |
| Melting point: | 231°C |

EXAMPLE 8

Analogously to Example 7, a polyester is manufactured from dimethyl terephthalate, ethylene glycol and 50 mol % of 1,3-bis-(2'-hydroxyethyl)-benzimidazolone, relative to DMT, using 0.015% of titanium tetraisopropylate as the catalyst. After a reaction time of 3 hours at 270°C and 0.6 mm Hg a transparent polyester having the following characteristic data is obtained:

| | |
|---|---|
| Relative viscosity: | 1.86 |
| Glass transition temperature: | 100°C |
| Softening point: | 175°C |

EXAMPLE 9

300 g of dimethyl terephthalate (DMT), 280 g of 1,4-butanediol, 32.5 g of 1,3-bis-(2'-hydroxyethyl)-benzimidazolone (10 mol % relative to DMT) and 0.178 g of isopropyl titanate are introduced into a 2 litre reactor equipped with a stirrer, nitrogen inlet, condenser and temperature measuring device. 97% of the amount of methanol to be expected theoretically are distilled off over the course of 1 hour and 45 minutes whilst stirring and passing nitrogen through the mixture, and during this time the temperature of the reaction mixture rises to 220°C. After heating the reaction mixture to 240°C. a vacuum of 50 mm Hg is applied over the course of half an hour by means of a water pump and at the same time the reaction temperature is raised to 250°C. The vacuum is improved to 0.45 mm Hg by means of a vacuum pump over the course of 45 minutes, with the reaction temperature remaining the same. 50 minutes after reaching this vacuum, the reaction is stopped. A partially crystalline polyester having the following characteristic data is obtained:

| | |
|---|---|
| Relative viscosity: | 1.88 |
| Glass transition temperature: | 43°C |
| Crystallisation temperature: | 80°C |
| Melting point: | 208°C |

EXAMPLE 10

0.1 mol of terephthaloyl chloride and 0.1 mol of 1,3-bis-(2'-hydroxyethyl)-benzimidazolone together with 200 ml of o-dichlorobenzene are introduced into a round flask equipped with a stirrer, reflux condenser and nitrogen inlet. After introducing nitrogen, 0.9 g of triethylamine and 0.02 g of magnesium filings as the catalyst are added and the reaction mixture is slowly heated to the boil whilst stirring under a nitrogen atmosphere. After 24 hours, the evolution of hydrogen chloride has ceased. The reaction mixture is cooled and 1.5 litres of methanol are slowly added thereto, with vigorous stirring. The polymer which hereupon precipitates is filtered off, washed with pure methanol and dried in vacuo at 120°C. The resulting polyester has the following properties:

| Relative viscosity: | 1.34 |
|---|---|
| Glass transition temperature: | 130°C |
| Softening point: | 178°C |

EXAMPLE 11

A polyester of dimethyl terephthalate, ethylene glycol and 50 mol % of 1,3-bis-(2'-hydroxyethyl)-tetrahydrobenzimidazolone (relative to DMT) is manufactured analogously to Example 7, using 0.015% of titanium tetraisopropylate as the catalyst. After a reaction time of 2.75 hours at 270°C and 0.7 mm Hg, a transparent polyester having the following characteristic data is obtained:

| Relative viscosity: | 1.36 |
|---|---|
| Glass transition temperature: | 96°C |
| Softening point: | 170°C |

EXAMPLE 12

Analogously to Example 7, a polyester is manufactured from dimethyl terephthalate, ethylene glycol and 10 mol % of 1,3-bis-(2'-hydroxyethyl)-tetrahydrobenzimidazolone (relative to DMT) using 0.015% of titanium tetraisopropylate as the catalyst. After a reaction time of 1.5 hours at 260°C and 0.5 mm Hg, a partially crystalline polyester having the following characteristic data is obtained:

| Relative viscosity: | 1.43 |
|---|---|
| Glass transition temperature: | 84°C |
| Melting point: | 231°C |

EXAMPLE 13

A polyester is manufactured from terephthaloyl chloride and 1,3-bis-(2'-hydroxypropyl)-benzimidazolone analogously to Example 10. The reaction time is 26 hours. The polyester has the following properties:

| Relative viscosity: | 1.17 |
|---|---|
| Glass transition temperature: | 95°C |
| Softening point: | 170°C |

EXAMPLE 14

Analogously to Example 7, a polyester is manufactured from dimethyl terephthalate, ethylene glycol and 10 mol% of 1,3-bis-(2'-hydroxy-n-butyl)-benzimidazolone (relative to DMT) using 0.015% of titanium tetraisopropylate as the catalyst. After a reaction time of 4.5 hours at 275°C and 0.6 mm Hg, a partially crystalline polyester having the following characteristic data is obtained:

| Relative viscosity: | 1.23 |
|---|---|
| Glass transition temperature: | 71°C |
| Melting point: | 255°C |

EXAMPLE 15

A polyester is manufactured from isophthaloyl chloride and 1,3-bis-(2'-hydroxyethyl)-benzimidazolone analogously to Example 10. The reaction time is 20 hours. The polyester has the following properties:

| Relative viscosity: | 1.45 |
|---|---|
| Glass transition temperature: | 102°C |
| Softening point: | 167°C |

EXAMPLE 16

Analogously to Example 10, a polyester is manufactured from 0.1 mol of terephthaloyl chloride, 0.01 mol of 1,3-bis-(2'-hydroxyethyl)-benzimidazolone and 0.09 mol of 1,4-butanediol. The reaction time is 25 hours. The polyester thus obtained has the following properties:

| Relative viscosity: | 1.33 |
|---|---|
| Glass transition temperature: | 42°C |
| Crystallisation temperature: | 80°C |
| Melting point: | 207°C |

EXAMPLE 17

15.9 g of diphenyl terephthalate (0.05 mol), 11.1 g of 1,3-bis-(2'-hydroxyethylbenzimidazolone (0.05 mol) and 0.008 g of titanium tetraisopropylate are brought to 250°C over the course of 1 hour in a 100 ml reactor equipped with a stirrer, nitrogen inlet and condenser, during which time phenol begins to distil off; after a further hour the distillation of phenol has ceased. The temperature of the reaction mixture is then raised to 270°C and a vacuum of 0.7 mm Hg is applied at the same time. After 2.5 hours' reaction time under these conditions, the reactor is flushed with nitrogen and a polyester having the following properties is obtained:

| Relative viscosity: | 1.35 |
|---|---|
| Glass transition temperature: | 131°C |
| Softening point: | 170°C |

We claim:

1. A linear, thermoplastic homopolyester or copolyester of relative viscosity 0.5 – 3.0 dl/g, measured at 30°C on a 1% strength solution consisting of equal parts of phenol and tetrachloroethane, consisting esentially of the structural element of the formula

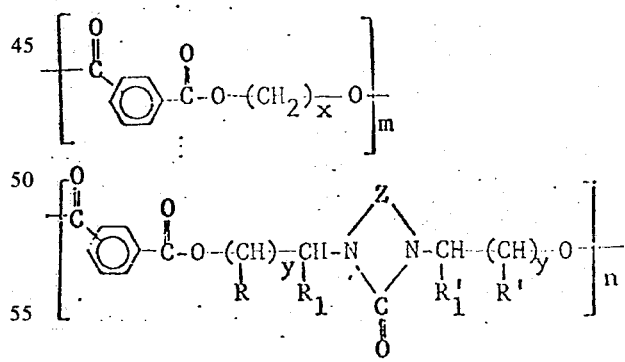

wherein the two carbonyl groups located on the aromatic ring are in the para- or meta-position to one another, Z denotes a divalent radical of the formulae

R and R' independently of one another each denotes hydrogen methyl or phenyl, $R_1$ and $R_1'$ each denotes hydrogen or R and $R_1$, and/or $R_1'$ and R', together denote the tetramethylene radical, y denotes the number 0 or 1, x represents a number from 2 to 10, m represents 0 or integers and n represents integers, and the porportion of n to m corresponds to the quotient $n/(m + n) = 0.005$ to 1.0.

2. A polyester according to claim 1 of relative viscosity 1.0 to 2.5 dl/g, wherein, in the structural element of the formula x represents a number from 2 to 4 and wherein the proportion of n to m corresponds to the quotient $n(n + m) = 0.05$ to 1.0.

3. A homopolyester according to claim 1, having the recurring structural element of the formula

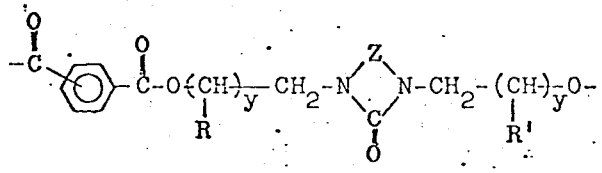

wherein Z has the same meaning as in claim 1, R and R' each denotes hydrogen or methyl and y denotes the number 0 or 1.

* * * * *